Nov. 9, 1926.   1,606,644
T. A. LEMASTER
APPARATUS FOR CONTROLLING THE SPEED AND VOLTAGE OF DIRECT CURRENT DYNAMOS
Original Filed Feb. 1, 1924
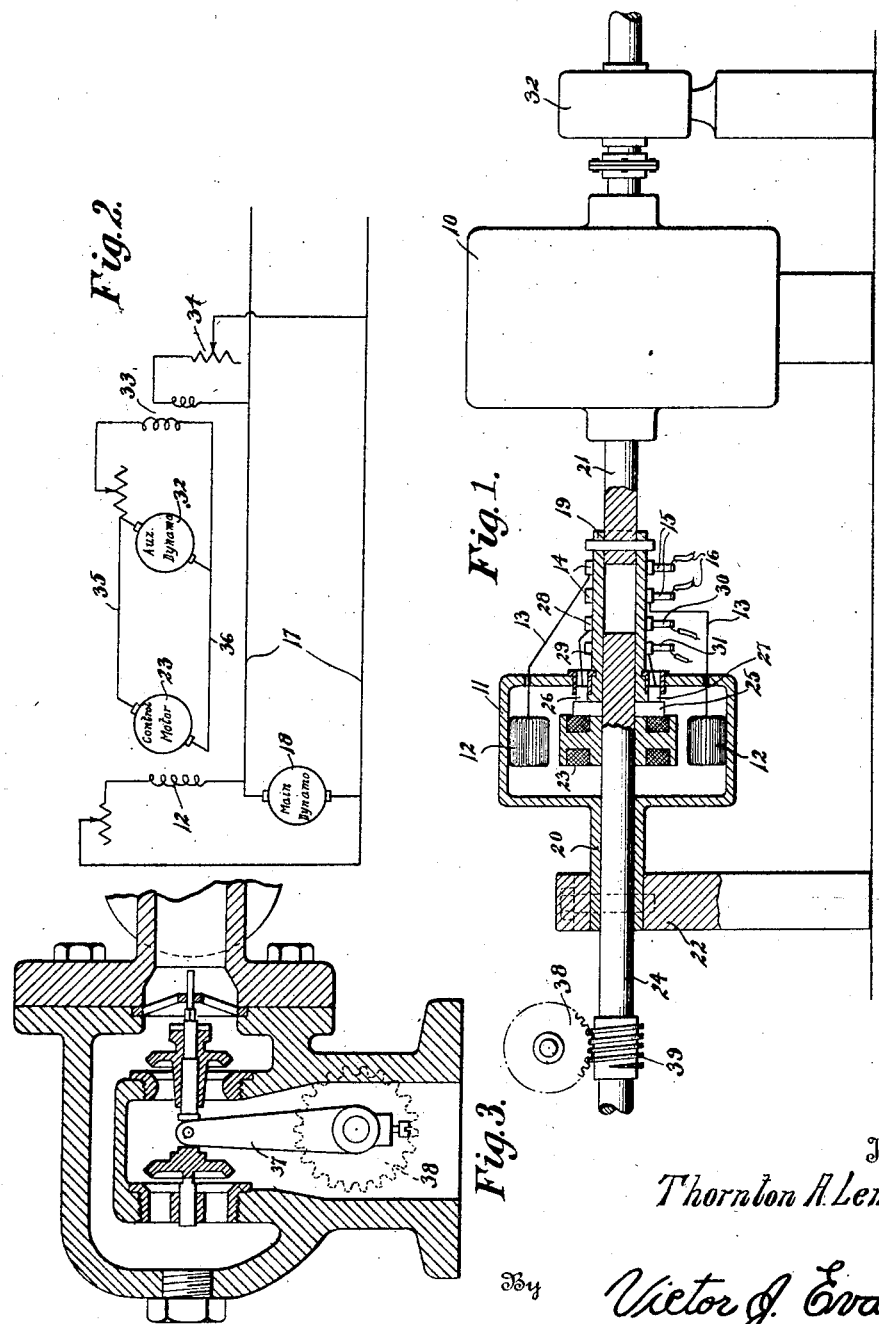
Inventor
Thornton A. Lemaster.
By Victor J. Evans.
Attorney Patented Nov. 9, 1926.

1,606,644

UNITED STATES PATENT OFFICE.

THORNTON A. LEMASTER, OF FORT MONROE, VIRGINIA, ASSIGNOR OF ONE-HALF TO CECIL R. COILE, OF FORT MONROE, VIRGINIA.

APPARATUS FOR CONTROLLING THE SPEED AND VOLTAGE OF DIRECT-CURRENT DYNAMOS.

Application filed February 1, 1924, Serial No. 690,000. Renewed May 27, 1926.

This invention relates to control devices for direct current generators and has for its object the provision of means whereby a constant potential across two fixed points may be maintained.

A more specific object is the arrangement of a direct current shunt motor in conjunction with a pilot prime mover for maintaining a constant voltage in the output line.

Essentially the invention contemplates the provision of a control motor having its field energized by the main generator which it is to control and positively driven by a constant speed pilot prime mover which additionally operates to drive an auxiliary dynamo energizing the armature of the control motor, the rotatable element of the control motor being what is ordinarily considered the magnetic yoke or field, the armature remaining stationary when the output from the main generator is constant, the arrangement being such that a variation in the voltage of the output will cause a variation in the reaction between the rotating and normally stationary coils which will result in turning the armature, which turning movement is utilized for varying the speed of the prime mover for the main generator so that automatic compensation is made for different load conditions.

Another object is the provision of an apparatus of this character which is particularly well adapted for use in isolated hydro-electric plants, though quite naturally there is absolutely no limitation in this respect as the system is capable of installation in connection with all types of plants using direct current generators.

An additional object is the provision of a control mechanism of this character which will be entirely automatic in action, easy to control, inexpensive to install, efficient and durable in service and a general improvement in the art.

With the above and other objects and advantages in view the invention consists in the details of construction to be hereinafter more fully described and claimed and illustrated in the accompanying drawings, in which:

Figure 1 is a longitudinal section, partly in elevation, illustrating my apparatus, Figure 2 is a diagram of the circuit, Figure 3 is a sectional view illustrating a valve device capable of controlling the prime mover.

Referring more particularly to the drawings, the numeral 10 designates a pilot prime mover which might be any ordinary or prefered type of power device either of the electrical or mechanical type and which may very conveniently be a water motor or turbine if the apparatus is installed at a hydro-electric plant. It should however be distinctly understood that there are no limitations in this particular. In conjunction with this pilot prime mover which is operated from any suitable means, I make use of a control motor which has a casing or housing 11 carrying field coils 12 connected by wires 13 with slip rings 14 engaged by brushes 15 to which current is supplied through wires 16 connected with the output line wires 17 of the main dynamo 18. This outer member or field element of the control motor is provided at opposite sides with elongated cuffs or sleeves 19 and 20, the former of which is rigidly secured upon or otherwise connected with the shaft 21 of the pilot prime mover 10 so as to be driven thereby, and the latter of which constitutes a journal rotatable in a supporting bearing 22.

The control motor further includes an armature 23 mounted on a shaft 24 journaled through the sleeve or cuff 20. Carried by the shaft or by the armature is a commutator 25 engaged by brushes 26 and 27 connected respectively with slip rings 28 and 29 engaged by brushes 30 and 31.

The numeral 32 designates an auxiliary dynamo which may be connected directly with the shaft 21 of the pilot prime mover or which may be driven thereby in any other desired manner. The differential field 33 of this dynamo is connected with the output line wires 17 from the main dynamo and a suitable control rheostat 34 is interposed. The output from the auxiliary dynamo is conducted to the brushes 30 and 31 by wires 35 and 36.

Referring to Figure 2 which shows a diagram of the electrical connections, it will be noted that the field 12 of the control motor and the differential field of the auxiliary dynamo are both connected across the terminals of the main D. C. generator.

Quite naturally the prime mover for driving the main dynamo 18 might be a steam engine, turbine or other suitable mechanical device and such is not illustrated as it forms no part of the present invention. However let it be assumed for the sake of illustration, that it is a water turbine embodying the control valve structure shown in Figure 3 which discloses a balanced valve for regulating the flow of water to a suitable turbine. While other means might be employed, I have illustrated this valve as equipped with operating means comprising a lever 37 movable by means of a worm wheel 38 with which meshes a worm 39 on the shaft 24.

The operation of the above described control apparatus is as follows:

The field 12 of the control motor is driven against the normal rotation of the armature by means of the pilot prime mover 10 which also drives the auxiliary dynamo, and at a speed equal to the normal relative speed of the armature and field when normal voltage is impressed across them. When the voltage is normal the armature and shaft 24 both remain stationary. If the load on the main dynamo increases, there is a tendency to decrease the speed and consequently the voltage. This drop in voltage will weaken the field 12 of the control motor and the differential action of the differential field winding of the auxiliary dynamo, thereby allowing the voltage of the auxiliary dynamo to increase, both of which changes will increase the relative speed of the control motor armature and field. Since the field is driven at a constant speed by the pilot prime mover, in order that the relative speed of the control motor armature and field may increase, it follows that the armature will turn in a direction opposite to the field, the shaft 24 of course turning and increasing the power supplied to the prime mover through the valve mechanism disclosed or through some equivalent control device, until the speed of the prime mover increases sufficiently to bring the main dynamo voltage back to normal, whereupon the armature of the control motor would come to rest. If there should be a decrease in the load on the main dynamo there would be the reverse effect in that the speed and voltage of the main dynamo would increase, thereby increasing the strength of the field 12 of the control motor and decreasing the voltage impressed on its armature by increasing the differential effect on the field of the auxiliary dynamo. This would have a two fold effect in decreasing the relative speed of the control motor armature and field which means that the armature would turn in the same direction as the field and operate to vary the position of the valve structure or other equivalent mechanism for reducing the power applied to the prime mover for the main dynamo until normal voltage is reestablished, whereupon the armature and shaft 24 again come to rest.

While a specific control device for the prime mover has been shown and described, it should be distinctly understood that any other device for this purpose may be provided and it is likewise true that there may be any desired variation in the construction of the control motor or other parts of the apparatus. In fact the right is reserved to make all such changes in the form, arrangement and other details as will not depart from the spirit of the invention or the scope of the subjoined claims.

Having thus described my invention I claim:

1. Means for automatically controlling the prime mover of a D. C. dynamo for maintaining constant speed and voltage, comprising a pilot prime mover, a motor having a rotary field driven by said pilot prime mover and having a normally stationary armature, control means for the prime mover operatively connected with said motor armature, the dynamo being connected with said field coils for exciting the same, and an auxiliary dynamo driven by the pilot prime mover and supplying current to said armature, said auxiliary dynamo having a differential field.

2. Means for regulating a prime mover for a direct current dynamo whereby to maintain constant speed and voltage, comprising a pilot prime mover, a motor having a rotary field driven by the pilot prime mover and having a normally stationary armature, a control device for the power to the prime mover operatively connected with said armature, the field being excited by the dynamo, and an auxiliary dynamo driven by the pilot prime mover and having a differential field excited by the dynamo and having its output connected with the coils of said armature.

In testimony whereof I affix my signature.

THORNTON A. LEMASTER.